United States Patent Office 2,715,059
Patented Aug. 9, 1955

2,715,059

PHOSPHATIZING COMPOSITION

Dariel E. Miller, East Los Angeles, Calif., assignor to Kelite Products, Inc., Los Angeles, Calif., a corporation of California No Drawing. Application August 6, 1951,
Serial No. 240,600

1 Claim. (Cl. 23—106)

This invention relates to a new product combining sodium acid pyrophosphate and phosphoric acid, and to compositions including the same. The invention also relates to a process of producing the new compositions. While not necessarily limited thereto the invention also relates to compositions to be employed in the phosphatizing of metals and to the process of producing such compositions.

At present metal surfaces, such as iron, steel, etc., are subjected to a process known as phosphatizing for the purpose of conditioning their surfaces to enable paints and coatings to better adhere thereon. The phosphatizing compositions used in powder form have generally been monosodium phosphate. It is desirable to employ a more acid phosphate compound since the more acid phosphate compounds are more effective in treating the metal surfaces. Heretofore more acid phosphate compounds than monosodium phosphate have been liquids and require special acid-proof containers for holding such solutions in the phosphatizing process and for making shipment of such liquids.

One of the objects of the present invention is to produce a powdered composition which when added to water will produce a more effective and more acid phosphatizing solution, which composition may, however, be readily shipped in ordinary equipment, such as steel drums or fibre containers.

I have discovered a procedure of producing a more acid phosphate compound, which compound is in substantially dry form and is usable as an ingredient of phosphatizing compositions having many advantages over the compositions now in use. To produce the new phosphate compound of the present invention I combine either the ordinary commercial 85% phosphoric acid, $H_3PO_4$, and anhydrous sodium acid pyrophosphate, $Na_2H_2P_2O_7$, or such commercial 85% phosphoric acid and anhydrous sodium acid pyrophosphate and monosodium phosphate. Sodium acid pyrophosphate may be regarded as an anhydrous form of monosodium phosphate. Thus, sodium acid pyrophosphate may be considered a form of monosodium phosphate in accordance with the following equation:

$$(2NaH_2PO_4) = Na_2H_2P_2O_7 + H_2O$$

If attempts are made to produce a more acid compound by adding phosphoric acid to monosodium phosphate a wet acid product is produced which is difficult to handle and is corrosive to equipment used in shipping the same. By combining 85% phosphoric acid with sodium acid pyrophosphate the water content of the 85% acid will hydrolyze the sodium acid pyrophosphate to the ortho phosphate. One reaction is as follows:

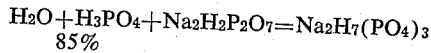

The foregoing reaction proceeds slowly when the dry anhydrous powdered acid pyrophosphate and 85% phosphoric acid are mixed together in the cold but with little heat the reaction takes place. By slightly warming the acid to say 140° F. the reaction is completed in one hour.

A further form of reaction on somewhat longer treatment occurs to form the hemi sodium phosphate:

$$H_2O + 2H_3PO_4 + Na_2H_2P_2O_7 = 2NaH_5(PO_4)_2$$

The second compound of the reaction is reported in the chemical literature while I do not know of any report of the first reaction. Heretofore the hemi sodium phosphate has been manufactured by a reaction between sodium hydroxide and pyrophosphoric acid and produced by such a reaction the hemi sodium phosphate is an expensive material. In this operation pyrophosphoric acid always contains metaphosphoric acid which makes it very difficult to control the reacting ingredients in stoichiometrical amounts. Moreover, in moist weather by the above previously known method it is practically impossible to produce the desired product in dry form due to the rapid adsorption of moisture by the pyrophosphoric acid. Furthermore, carbon tubes and stainless steel equipment is needed in this process which makes the final cost prohibitive.

In the process of the present invention the sodium acid pyrophosphate in dry anhydrous state is made to combine with ordinary commercial 85% phosphoric acid simply by agitation or mixing of these two materials together with the resulting production of a substantially dry product which is both readily handled and easy to control in stoichiometrical amounts.

The compound of the present invention, when added to water, will form a phosphatizing solution more acid than those now in use. The phosphatizing compositions at present in use employ the monosodium phosphate and in practice it is difficult with the monosodium phosphate to maintain a solution having a pH under 6. By utilizing the compound produced in accordance with the present invention a pH of 3 to 4 can be readily maintained at low concentrations, i. e., from ½ to 1 ounce per gallon. Accordingly by the use of the compounds of the present invention in phosphatizing metal a substantial amount of coating can be readily obtained with a small amount of material; an amount of coating that cannot be obtained wtih monosodium phosphate at even much higher concentrations. In this invention it also means that where no rinse is available after the phosphatizing coating smaller amounts of soluble salts are retained on the metal surface. Even using as low as ⅓ ounce per gallon it is possible to produce a phosphatizing solution which will maintain a pH of between 5 and 5.8 after a number of weeks of operation.

In producing a phosphatizing composition using the new phosphate compounds of the present invention it is preferable to utilize additional ingredients. Thus, it is desirable to add repressing agents intended to repress the precipitation of calcium compounds when the solution is formed with the use of hard water. Material such as sodium citrate or citric acid are suitable for this purpose. It is also desirable to use a wetting agent.

I have found by using, for example, molybdic acid as a component of the phosphatizing composition there is apparently produced a minute coating of a ferrous molybdic compound on the surface of the containers which acts to inhibit the acid phosphatizing solution from corroding the same. It also shows an inhibiting effect on iron equipment used in phosphatizing operations. The improvement effected by adding molybdic compound to the phosphatizing compound is of value both to the older forms of phosphatizing solutions using only the monosodium phosphate and to the present forms of phosphatizing solutions made combining phosphoric acid with sodium acid pyrophosphate.

The compounds of the present invention and phosphatizing compositions produced therefrom and the process of the present invention will be more fully understood from the following disclosure of the preferred example of the invention. In producing the new phosphate compounds of the present invention anhydrous sodium acid pyrophosphate and phosphoric acid (ordinary commercial 85% in strength) are mixed together in an agitator in proportions of from about 1 part of anhydrous sodium acid pyrophosphate to between 1 and 2 parts of the 85% phosphoric acid. The lower proportions of phosphoric acid tend to produce a compound of substantially the formula $Na_2H_7(PO_4)_3$ in one hour's time at moderately low temperatures of 140° F. Larger proportions of phosphoric acid operate to produce the hemi sodium phosphate $NaH_5(PO_4)_2$ and that product is found preferable in producing a phosphatizing composition. Whether the compound $Na_2H_7(PO_4)_3$ or the compound $NaH_5(PO_4)_2$ is produced in my invention, in both cases the product consists essentially of orthophosphoric acid compounds rather than pyrophosphoric acid compounds and these orthophosphoric acid compounds are more acidic than the primary sodium orthophosphates, thus the monosodium phosphate has a mol ratio of $Na_2O$ to $P_2O_5$ of 1 to 1. My new compound $Na_2H_7(PO_4)_3$, which may also be written as $2Na_2O.3P_2O_5.7H_2O$, has a mol ratio of $Na_2O$ to $P_2O_5$ of 2 to 3, while hemosodium phosphate has a mol ratio of $Na_2O$ to $P_2O_5$ of 1 to 2. I have thus found it possible to produce orthophosphates more acid than the primary phosphate in a dry condition. Furthermore these compounds are produced without going through a high temperature process where the materials undergo, or tend to undergo, fusion. The dry phosphate particles introduced as sodium acid pyrophosphate are converted into discrete particles of these more acid orthophosphoric acid compounds without undergoing fusion and this without necessitating any grinding. It is also practicable to include monosodium phosphate, and in the process of the present invention monosodium phosphate is employed in proportions of from 1 to 20 parts of monosodium phosphate to 1 part of sodium acid pyrophosphate. Normally in producing phosphate compositions I employ from 3 to 18 parts of the monosodium phosphate for each part of the anhydrous sodium acid pyrophosphate.

The additional ingredients such as the calcium ion repressing agent (sodium citrate or citric acid), a wetting agent and molybdic oxide are added after the formation of the new phosphate compound in producing the desired phosphatizing composition. The desired phosphatizing composition usually contains from 60 to 90% sodium monophosphate, from 35 to 5% of the new phosphate compound produced by the reaction of the phosphoric acid and anhydrous sodium acid pyrophosphate, from 1 to 5% of calcium repressing agent, from ¼ to 2% of a wetting agent, and from ¼ to 2% of molybdic oxide $MoO_3$. A typical example is as follows:

|  | Per cent |
|---|---|
| Monosodium phosphate $NaH_2PO_4$ | 66 |
| Sodium acid pyrophosphate | 17 |
| 85% phosphoric acid | 12 |
| Calcium repressing agent | 3 |
| Molybdic oxide 85% | 1 |
| Wetting agent | 1 |

Such a preparation is used for phosphatizing metals in quantities from about ½ to 2 ounces per gallon of water at temperatures of about 160° F. The solution prepared maintains a pH of around 3 to 4 as compared with previous phosphatizing solutions the pH of which is found to run from about 6 to 6.5.

To illustrate the benefit of molybdic oxide in the composition for preserving the containers of phosphatizing solutions, I prepared one composition in accordance with the above example omitting the molybdic oxide and another including 1% molybdic oxide. In the phosphatizing solution made from each composition I used 2 ounces of the composition per gallon of water and tested it in contact with 10/10 cold roll steel at 150° F. for 22 hours. The solution which omitted the molybdic oxide exhibited a penetration of .022 inch per year while that containing the molybdic oxide had a penetration of only .009 inch per year.

Whereas the preferred composition includes a wetting agent it is to be understood the wetting agent may be an alkyl aryl sulfonate such as Oronite D-40 or an alkyl sulfate such as Aquarex-D, or a nonionic wetting agent, or a dioctyl ester of sulfosuccinic acid such as Aerosol O. T. A nonionic wetting agent such as Triton X-100, an alkylated aryl poly-ether alcohol; Levelene, a product of the polyethylene type; Glim, which is an ethylene oxide condensation product; Span 20, which is a sorbitan monolaurate; Tween 40, a polyoxyalkylene ether of partial palmitic acid may be employed in an amount equal to ¼ to 1% of the composition.

The phosphatizing compositions made by including the new phosphate compound of the present invention have in practice demonstrated that they may effect treatment with the use of smaller amounts of material. This eliminates the necessity in many cases of using a rinse following the phosphatizing operation and the tanks of metal holding the phosphatizing solution have longer life.

While the particular examples of the invention herein are well adapted to carry out the objects of the invention various modifications and changes may be made and this invention is of the scope set forth in the appended claim.

I claim:

A process of producing a dry orthophosphate compound as discrete particles, which process comprises agitating granular anhydrous sodium acid pyrophosphate together with substantially 85% phosphoric acid in proportions of 1 part of the anhydrous sodium acid pyrophosphate to between 1 and 2 parts by weight of the 85% phosphoric acid, the agitation being conducted at a temperature of about 140° F.

References Cited in the file of this patent

UNITED STATES PATENTS

| 2,064,979 | Kaselitz | Dec. 22, 1936 |
| 2,331,196 | Jernstedt et al. | Oct. 5, 1943 |
| 2,337,491 | Perrin et al. | Dec. 21, 1943 |
| 2,493,809 | Garrison | Jan. 10, 1950 |
| 2,502,441 | Dodd et al. | Apr. 4, 1950 |
| 2,528,787 | Roland | Nov. 7, 1950 |
| 2,557,509 | Miller | June 19, 1951 |

OTHER REFERENCES

Mellor: Comprehensive Treatise on Inorganic and Theoretical Chemistry, vol. 2 (1922), page 861, publ. by Longmans, Green and Co., New York.